United States Patent [19]
Powell

[11] Patent Number: 5,533,578
[45] Date of Patent: Jul. 9, 1996

[54] TWO POINTED SHOVEL

[76] Inventor: Edward C. Powell, 1510 Austin St., College Station, Tex. 77845

[21] Appl. No.: 296,948

[22] Filed: Aug. 26, 1994

[51] Int. Cl.⁶ .................................................. A01B 1/02
[52] U.S. Cl. ........................................ 172/378; 294/49
[58] Field of Search ................... 172/378, 379, 172/380, 385; 294/10, 12, 49, 55; 30/329, 330

[56] References Cited

U.S. PATENT DOCUMENTS

| | | | |
|---|---|---|---|
| 2,747,911 | 5/1956 | Kuever | 294/49 X |
| 3,226,149 | 12/1965 | McJohnson | 294/49 X |
| 3,868,775 | 3/1975 | Anderson | 294/49 X |
| 4,135,751 | 1/1979 | Gederos | 294/49 |
| 4,334,583 | 6/1982 | Parker | 172/375 |

Primary Examiner—Eric K. Nicholson
Assistant Examiner—Robert Pezzuto
Attorney, Agent, or Firm—Michael I. Kroll

[57] ABSTRACT

A two pointed shovel comprising a structure bifurcated at a bottom edge of a shovel blade, for digging into and scraping the ground, so as to make the shovel blade more stable and less susceptible to rolling from side to side. The shovel blade is more efficient to use in removing various objects from the ground. A component between the bifurcated structure at the bottom edge of the shovel blade, is for cutting cleanly through a root when the root is encountered while digging into the ground.

1 Claim, 1 Drawing Sheet

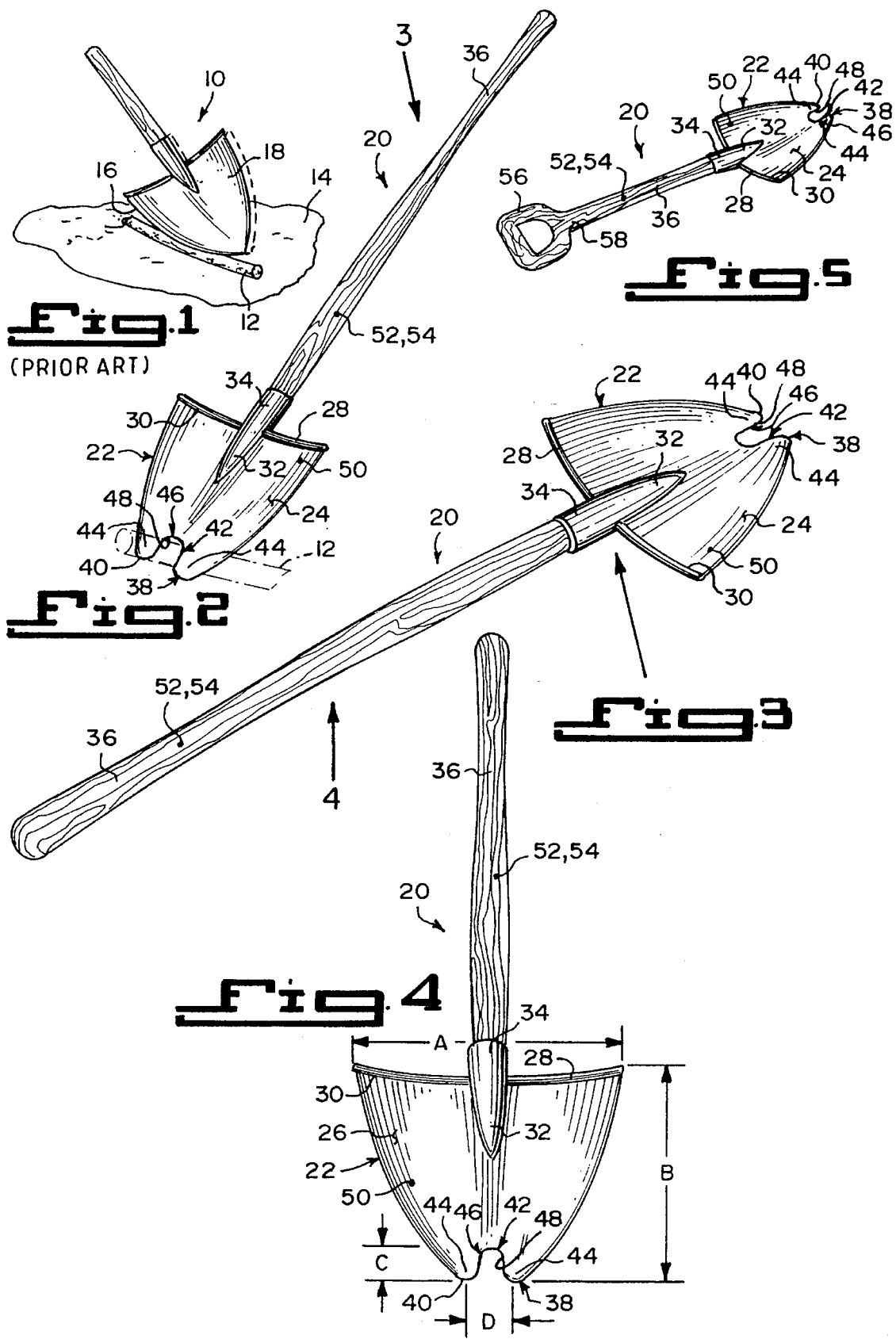

TWO POINTED SHOVEL

BACKGROUND OF THE INVENTION

1. Field of the Invention

The instant invention relates generally to digging and cutting tools and more specifically it relates to a two pointed shovel.

2. Description of the Prior Art

Numerous digging and cutting tools have been provided in prior art. For example, U.S. Pat. Nos. 249,665 to Pettebone; 3,868,775 to Anderson; 3,993,340 to Rusing et al.; 4,135,751 to Gederos; 4,357,043 to Towsend; 4,916,984 to Albert; 5,109,930 to Napier and 5,176,209 to VandenBrink all are illustrative of such prior art. While these units may be suitable for the particular purpose to which they address, they would not be as suitable for the purposes of the present invention as heretofore described.

PETTEBONE, ROBERT T.

VEGETABLE AND PLANT CUTTER AND HARVESTER

U.S. Pat. No. 249,665

A vegetable and plant cutter and harvester consists of a bowl adapted to contain the head of a plant when cut. The bowl is provided in front with a V-shaped recess having cutting edges to sever the stem of the plant and cause the latter to fall in the bowl. The bowl has a handle at the rear.

ANDERSON, ROBERT L.

SHOVEL MOUNTED WEED CUTTER

U.S. Pat. No. 3,868,775

A weed cutter attachment for a round headed shovel blade has a body member in the form of a bowed plate provided with bifurcated cutting surface on an edge of the plate. Each bifurcated part of the cutting surface is arcuate in plan, and cooperatively meets with the other part to form a substantially V-shaped recess. Clamps are arranged on a concave surface of the plate for selectively, retentively engaging a shovel blade and clamping the attachment onto the blade.

RUSING, WILLI

ADAMOVSKY, RUDOLF

CHOPPING SPADES

U.S. Pat. No. 3,993,340

A collapsible chopping spade comprises a shaft with a tool joint at one end and a handle joint at the other end, so that both the tool and the handle can be folded against the shaft. A unitary locking arrangement is provided, for securing the handle in either its operative or its folded away position and for securing the tool in either of two operative positions or in its folded away position. The arrangement being such that the handle joint cannot be locked with simultaneously locking the tool joint.

GEDEROS, WAYNE L.

RAZOR CLAM SHOVEL

U.S. Pat. No. 4,135,751

An improved clam shovel for digging razor clams includes a dished shovel blade attached to the lower end of a shovel shaft having a handle at its opposite end. The upper side of the shovel blade is transversely and longitudinally concave. The blade is longitudinally slotted inwardly from the center of its free cutting edge to about mid-length to define a pair of broad laterally spaced tines. The slot tapers inwardly from the blade cutting edge, so that its inner closed end is narrower than its outer open end and so that the slot resembles a wedge-blocked off and rounded at its narrow end.

TOWSEND, MARVIN S.

COMBINED BRUSH AND CUTTER ATTACHMENT FOR A SHOVEL BLADE

U.S. Pat. No. 4,357,043

The invention consists of a shovel blade attachment having both a brush and a cutter secured to the shovel blade by a common attaching assembly. Modifications of the shovel blade, such as drilled holes, are not required. Any conventional snow shovel can be readily converted into a shoveling, brushing and cutting implement by employing the attachment of the invention. The attachment is secured to the shovel blade. The attachment includes a brush, a cutter and an attaching assembly. The cutter has slots for adjusting the exposure of the cutter in contact with the shovel blade, in order that the shovel blade can absorb impact forces. Compression pads help secure the attachment to the shovel blade and provide clearance between a clamping plate and an upturned end of the shovel blade. Pads also provide clearance between the brush and a shovel blade indentation and clearance between the brush and a handle. A portion of the clamping plate may be sharpened into a cutting edge. A cutter may be attached to the brush, in order that the brush can absorb impact forces.

ALBERT, BARRY R.

SHOVEL BLADE AND METHOD OF MANUFACTURE

U.S. Pat. No. 4,916,984

A shovel blade comprises a body portion having an elongated socket at its rearward end and a digging portion integral with the socket and extending laterally outwardly and forwardly therefrom. The socket has a predetermined straight portion of longitudinal extent. The digging portion includes peripheral edges having rearward sections extending outwardly from opposite sides of the socket. The rearward sections include a pair of longitudinally extending slots spaced on either side of and substantially adjacent to the socket. The peripheral edge extending laterally outwardly from each slot is bent at a substantial right angle to form a platform step.

NAPIER, DENNIS K.

EARTH SPLITTER

U.S. Pat. No. 5,109,930

An earth splitting tool comprised of a central shaft, a handle bar, a foot pressure bar and a wedge-shaped blade is disclosed. The blade has two primary trapezoid-shaped faces, two triangular side faces and a rectangular butt face. One primary face in the same plane as a tangent to the surface of the central shaft. The butt face has a width substantially the same as the thickness of the central shaft. The butt face may be perpendicular to the axis of the central shaft, or it may be sloped away from the perpendicular. The length of the butt face may also be substantially the same as the thickness of the central shaft.

VANDENBRINK, MARK

CULTIVATOR SWEEP

U.S. Pat. No. 5,176,209

A cultivator sweep or shovel includes a rigid generally arrowhead shaped body, having a central mounting flange enabling attachment to a support shank or tine. The sweep has rearwardly diverging primary cutting edges and one or more outwardly and forwardly projecting weed cutting points formed along the primary cutting edges to capture and sever weeds in the path of the sweep, so as to prevent weeds from slipping past the sweep.

SUMMARY OF THE INVENTION

A primary object of the present invention is to provide a two pointed shovel that will overcome the shortcomings of the prior art devices.

Another object is to provide a two pointed shovel, in which the blade has two prongs on its bottom edge to make it more stable and less susceptible to rolling from side to side when scraping the ground, thereby it is more efficient to use in removing various objects, such as dirt, gravel, animal feces and the like.

An additional object is to provide a two pointed shovel, in which the two prongs on the bottom edge of the blade will reduce the effort in forcing the blade into the ground from between twenty to thirty percent, and the indentation between the prongs will engage with and cut cleanly through a root when encountered while digging into the ground.

A further object is to provide a two pointed shovel that is simple and easy to use.

A still further object is to provide a two pointed shovel that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the prior art being a traditional round point shovel, with its handle broken away, trying to cut into a root on the ground.

FIG. 2 is a front perspective view of the instant invention showing a root in phantom between the two prongs ready to be cleanly cut.

FIG. 3 is a front perspective view of the instant invention shown in FIG. 2.

FIG. 4 is a rear perspective view taken in the direction of arrow 4 in FIG. 3.

FIG. 5 is a front perspective view similar to FIG. 3 of a modification, in which the handle has a D-shaped hand grip formed on its distal free end instead of being completely straight.

DETAILED DESCRIPTION OF THE PREFERRED EMBODIMENTS

Turning now descriptively to the drawings, in which similar reference characters denote similar elements throughout the several views, FIG. 1 shows the prior art which is a traditional round pointed shovel 10, trying to cut into a root 12 on the ground 14. Instead, the root 12 is sliding off the side 16 of the blade 18 on the shovel 10.

FIGS. 2 through 5 illustrate the instant invention, which is a two pointed shovel 20 comprising a shovel blade 22, having front and rear faces 24, 26 laterally and longitudinally curved to produce a depression in the front face 24. A turned step 28 is on a top edge 30 of the shovel blade 22. A frog 32 is centrally mounted transversely to the turned step 28 on the top edge 30 of the shovel blade 22. A socket 34 is formed in the frog 32, while an elongated handle 36 extends rearwardly from the socket 34.

A structure 38 bifurcated at a bottom edge 40 of the shovel blade 22, is for digging into and scraping the ground 14, so as to make the shovel blade 22 more stable and less susceptible to rolling from side to side. The shovel blade 22 is more efficient to use in removing various objects from the ground 14. A component 42 between the bifurcated structure 38 at the bottom edge 40 of the shovel blade 22, is for cutting cleanly through a root 12, when the root 12 is encountered while digging into the ground 14.

The bifurcated structure 38 includes a pair of prongs 44, formed at the bottom edge 40 of the shovel blade 22. The prongs 44 will reduce the effort in forcing the shovel blade 22 into the ground 14 from between twenty to thirty percent, by providing more surface area in contact with the ground 14 and also have four lead in areas.

The cutting component 42 is an indentation 46 between the pair of prongs 44. The indentation 46 will engage with the root 12, when the root 12 is encountered while digging. Edges 48 on the indentation 46 will cut cleanly through the root 12.

The shovel blade 22, the turned step 28, the frog 32, the socket 34 and the pair of prongs 44 are integral and fabricated out of a single piece of durable non-corrosive material 50. The durable non-corrosive material 50 is tempered steel carbon. The width "A" of the shovel blade 22 from end to end of the turned step 28, is typically but not limited to ten inches. The length "B" of the shovel blade 22 from the turned step 28 to the tips of the pair of prongs 44, is typically but not limited to fifteen and one quarter inches.

The depth "C" of each prong 44, is typically but not limited to three quarters of an inch. The span "D" between the tips of the pair of prongs 44, is typically but not limited to three inches.

The handle 36 can be fabricated out of wood 52. The handle 36 can also be fabricated out of fiberglass 54. In FIGS. 2, 3 and 4, the handle 36 is completely straight. In FIG. 5, the handle 36 contains a D-shaped hand grip 56, formed on a distal free end 58, opposite from the socket 34.

The two pointed shovel 20 can be incorporated into other types of shovels, such as sharp shooters, hand held models and the like. The two pointed shovel 20 would benefit military and forest fire fighters applications because of the new features.

LIST OF REFERENCE NUMBERS 10 traditional round point shovel
12 root
14 ground
16 side of 18
18 blade of 10
20 two pointed shovel
22 shovel blade
24 front face of 22
26 rear face of 22
28 turned step on 30
30 top edge of 22
32 frog on 22
34 socket in 32
36 elongated handle
38 bifurcated structure at 40
40 bottom edge of 22
42 cutting component
44 prong of 38
46 indentation of 42
48 edge on 46
50 durable non-corrosive material
52 wood for 36
54 fiberglass for 36
56 D-shaped hand grip on 58
58 distal free end of 36
A width of 22
B length of 22
C depth of 44
D span between 44

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A two pointed shovel comprising:
    a) a shovel blade having front and rear faces laterally and longitudinally curved to produce a depression in the front face;
    b) a turned step on a top edge of said shovel blade;
    c) a frog centrally mounted transversely to said turned step on the top edge of said shovel blade;
    d) a socket formed in said frog;
    e) an elongated handle extending rearwardly from said socket; and
    f) means bifurcated at a bottom edge of said shovel blade, for digging into and scraping the ground, so as to make said shovel blade more stable and less susceptible to rolling from side to side, said bifurcated means consisting of a pair of prongs, the side edges of said shovel being continuous and terminating in said prongs forming an indentation of shallow depth of about three quarters of an inch from the tips of said prongs and a width between said tips of said prongs of about three inches and cutting edges lining said indentation for cutting cleanly through a root when the root is encountered while digging into the ground, said shovel blade being thereby more efficient to use in removing various objects from the ground while digging, said shovel blade including said bifurcated means being fabricated out of a single piece of durable non-corrosive material.

* * * * *